United States Patent [19]

Henault

[11] 3,976,039
[45] Aug. 24, 1976

[54] INTERNAL COMBUSTION ENGINE WITH STRATIFIED CHARGE

[75] Inventor: Claude Henault, Chevilly-Larue, France

[73] Assignees: Regie Nationale Des Usines Renault; Societe dite: Automobiles Peugeot, both of Paris, France

[22] Filed: July 5, 1974

[21] Appl. No.: 486,230

[30] Foreign Application Priority Data

June 6, 1973 France .............................. 73.24939

[52] U.S. Cl. ..................... 123/32 ST; 123/26; 123/90.6; 123/119 D; 60/305
[51] Int. Cl.² ..................... F02B 19/10; F02B 19/18
[58] Field of Search ................. 123/32 ST, 90.6, 26, 123/119 D, 124 R; 60/304, 305

[56] References Cited
UNITED STATES PATENTS

| | | | |
|---|---|---|---|
| 1,054,080 | 2/1913 | Bachman | 123/26 |
| 1,950,467 | 3/1934 | Willgoos | 60/305 |
| 2,011,986 | 8/1935 | Schwarz | 123/26 |
| 2,052,279 | 8/1936 | Colwell | 60/304 |
| 2,196,071 | 4/1940 | Hudson | 123/32 ST |
| 2,477,230 | 7/1949 | Bell | 123/26 |
| 3,019,777 | 2/1962 | Candelise | 123/26 |
| 3,298,332 | 1/1967 | Elsbett | 123/90.6 |
| 3,443,552 | 5/1969 | Vonseggern | 123/32 ST |

FOREIGN PATENTS OR APPLICATIONS

| | | | |
|---|---|---|---|
| 1,576,752 | 2/1967 | Germany | 60/305 |
| 360,382 | 5/1929 | United Kingdom | 60/304 |

*Primary Examiner*—Charles J. Myhre
*Assistant Examiner*—Ronald B. Cox
*Attorney, Agent, or Firm*—Oblon, Fisher, Spivak, McClelland & Maier

[57] ABSTRACT

A piston type internal combustion engine operating on the stratified charge principle with the object of non-polluting combustion wherein the engine has a standard valve-charging with a rich mixture. After admission of the rich mixture a quantity of air is introduced into the combustion region opposite the spark plug, before ignition, through the exhaust valve opening or by an independent valve opening into the combustion chamber or a precombustion chamber. The introduction of air can be effected either by the exhaust valve with a precombustion chamber being associated with the inlet valve or exhaust valve.

12 Claims, 11 Drawing Figures

3,976,039

INTERNAL COMBUSTION ENGINE WITH STRATIFIED CHARGE

BACKGROUND OF THE INVENTION

1. Field of the Invention

The present invention relates to an internal combustion engine and more particularly to a standard type internal combustion engine with pistons, operating on the stratified charge principle resulting in non-polluting combustion of the fuel-air mixture forming the charge.

2. Description of the Prior Art:

The stratified charge principle consists of forming in the engine combustion chambers, at the instant of ignition, a mixture of heterogeneous richness, rich in the vicinity of the spark plug and lean in the rest of the chamber. The easy ignition by the plug of the pocket of rich mixture surrounding it starts the combustion which then spreads to the remaining lean mixture. The result is complete final combustion because of the low overall richness of the whole charge.

Different ways are known to the prior art for obtaining such charge and stratified combustion. One such method is to introduce the rich mixture into a precombustion chamber next to the cylinder with which it communicates, the spark plug facing into this precombustion chamber with the lean mixture being simultaneously introduced into the cylinder in the normal way. In such case, the configuration of the chambers and the adjustment of the dual inlet of the rich and lean mixtures assures stratification. This method is effective, but it has proven to be costly because of the use of a complex cylinder head, timing system and fuel feed.

Another known way of stratification is that done directly into the combustion chamber, either by injecting fuel near the spark plug in the center of an air swirl, or, as in the French Pat. No. 70/34,461 of Sept. 3, 1970, in the applicants' name, by admission of a charge pre-stratified in the exit of the inlet manifold with the layer of richest mixture being directed at the spark plug. Effective adjustment of stratification by direct injection of fuel has not been possible as of yet and the pre-stratification in the inlet, though a very economical solution, is not readily adaptable to different types of motors and the stratification effect in such method is limited.

SUMMARY OF THE INVENTION

Accordingly, it is an object of the present invention to provide a new and improved motor with a stratified charge formed in the combustion chamber.

Briefly, in accordance with the present invention, the foregoing and other objects are attained by a motor with the stratified charge formed right in the combustion chamber, the stratification being realized by starting with the introduction of a rich primary mixture followed by introduction of air into the region opposite the spark plug, resulting at the instant of ignition in a volume of the initial rich mixture crowding into the vicinity of the plug by the introduction of the air, such rich ignition mixture being separated from the volume of injected air forming a reserve for combustion by a region of intermediate richness.

The introduction of the thinning air can be accomplished through a passage opening into the exhaust port immediately downstream of the valve seat. The orientation will depend on the position of the spark plug such that the rich mixture will be forced towards it. This method has the advantage of great simplicity in construction permitting injection of air during the opening-overlap period of the valves and possibly at the end of the inlet period by a supplementary lift of the exhaust valve.

In another arrangement allowing greater flexibility in adjustment of air injection, but with increased cost, the injection is accomplished through an independent auxiliary valve (either under pressure or not) either into the combustion chamber directly, on the side opposite the ignition region, or into an auxiliary chamber. This chamber will contain a reserve of air at the moment of explosion in the main chamber which will take part in the combustion during its concluding phase (end of power stroke or beginning of exhaust). The pressurized injected air will be supplied by a standard type of air pump currently used by post-combustion systems.

BRIEF DESCRIPTION OF THE DRAWINGS

Various other objects, features and attendant advantages of the present invention will be more fully appreciated as the same becomes better understood from the following detailed description when taken in conjunction with the accompanying drawings, in which like reference numerals designate like or corresponding parts throughout the several views and wherein.

DETAILED DESCRIPTION OF THE PREFERRED EMBODIMENT

Figure 1:
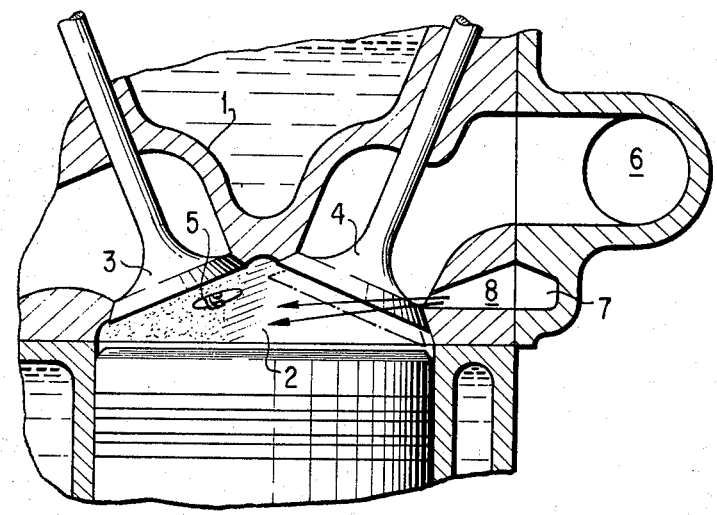
FIG. 1 is a schematic view in axial section of a combustion chamber according to the present invention employing introduction of air through the opening of the exhaust valve.

Referring now to the drawings, and more particularly to FIG. 1 wherein there is shown a cylinder head 1 with a combustion chamber 2 essentially spherical in form having an inlet valve 3, exhaust valve 4, spark plug 5 and exhaust manifold 6.

An air passage 7 under pressure, fed by an air pump, not shown, feeds by way of passage 8 into the peripheral region behind the exhaust valve 4.

Figure 2:
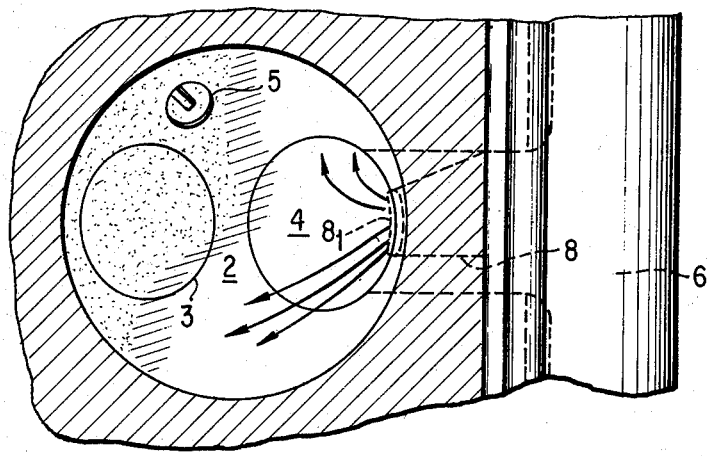
FIG. 2 is the same arrangement as in FIG. 1 as viewed from above.

As is shown in FIG. 2, the passage 8 leads to the edge of the valve opposite the spark plug 5. During the period of delay in the closing of the exhaust valve at the beginning of admission, the air will be introduced by passage 8 and the opening of valve 4 into the chamber 2, where it distributes itself essentially as shown by the arrows in FIG. 2, leaving a pocket of fuel mixture, shown dotted, introduced simultaneously by valve 3, around the plug 5.

Figure 3:
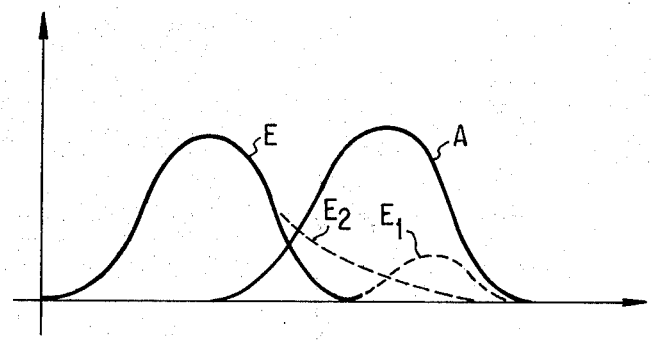
FIG. 3 is a graphical example of the lift function of the exhaust valve.

The above-described distribution can be strengthened by a second lifting of the exhaust valve at the end of admission, as shown by the dashed line E1 of FIG. 3, prolonging the curve E of the usual exhaust valve lift, coinciding in time with the closure A of the inlet valve. Closure of the exhaust valve can also be slowed as indicated by the dashed line E2.

The introduction of additional air accentuates the effect of stratification and the mixtures over-all leanness. Blowing of the air along the walls of the chamber reduces condensations of the fuel thereon resulting from unburnt products.

Figure 4:
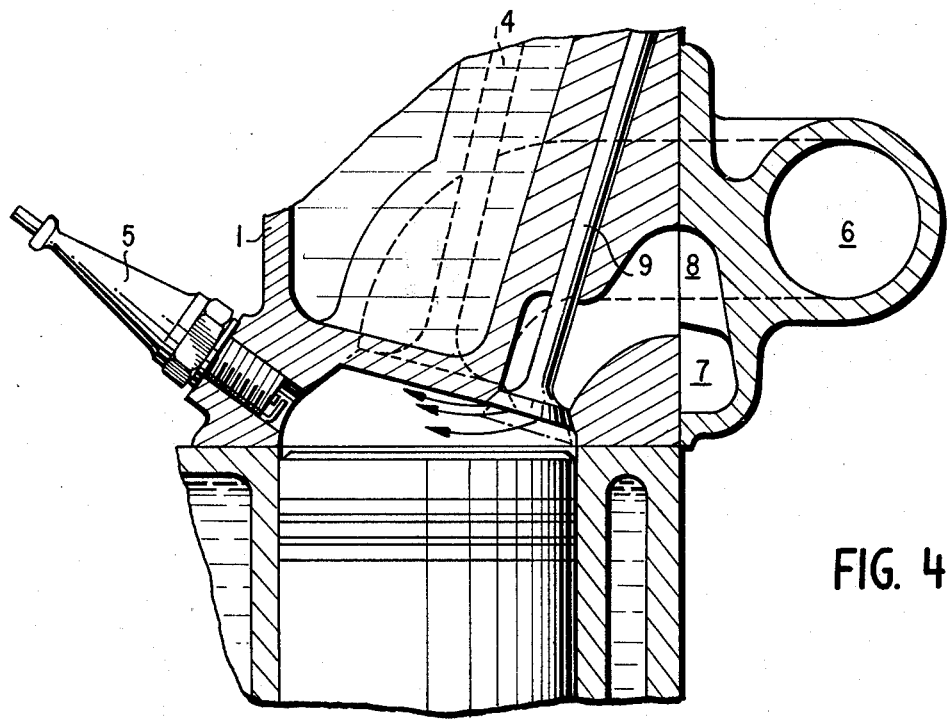
FIG. 4 is a schematic axial section through a combustion chamber according to the invention with air introduced by an auxiliary valve.
Figure 5:
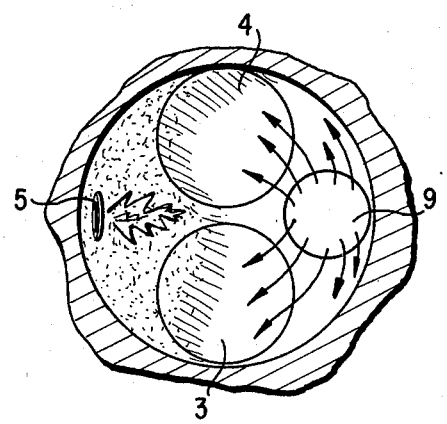
FIG. 5 is a top view of the chamber of FIG. 4.

FIGS. 4 and 5 show the application to a combustion chamber of the "corner-firing" type of the injection of charge-stratifying air according to the present invention, in this case directly by a valve 9 controlled by the same timing system, not shown, as the inlet valves 3 and exhaust valves 4 and which could be by an overhead camshaft for the latter, arranged in-line, and by rocker or pawls for valve 9, in a self-evident manner.

As in the case of FIGS. 1 and 2, the compressed air supply passage 7 will advantageously be provided, by being cast in the exhaust manifold 6, with openings at its surface in the plane of attachment to the cylinder head 1, into the connecting passages 8, also obtained by direct casting in the cylinder head 1. The output orifice of passage 8, at the valve, will best be in the form of a slot parallel to the circular gap of the valve opening. It will advantageously be located close to the exhaust valve gap just above the valve seat on the side opposite the spark plug 5 with respect to the axis of the valve.

In the case of FIGS. 4 and 5, the large degree of freedom of control obtained by valve 9 will permit introduction of air at the end of admission of the charge and during the beginning of the compression phase leaving practically no time for the stratification, thus attained, to deteriorate before ignition. The result is a tighter control of running conditions and of depollution.

Before ignition, the inrush of air in the direction of the arrows of FIGS. 4 and 5 crowds the fuel mixture into the region shown dotted around the plug 5, with a zone of intermediate richness due to mixture of the two phases. A good sweeping effect of part of the walls and entrainment of condensed fuel is obtained particularly when the injected air has been heated by its passage through ducts 7 and 8 along the exhaust manifold 6. In addition, the head of the exhaust valve will be effectively cooled. The introduction of air forms a very lean mixture, the combustion of which is assisted by the heating it experiences in its travel through the passage formed in the exhaust manifold.

Figure 6:
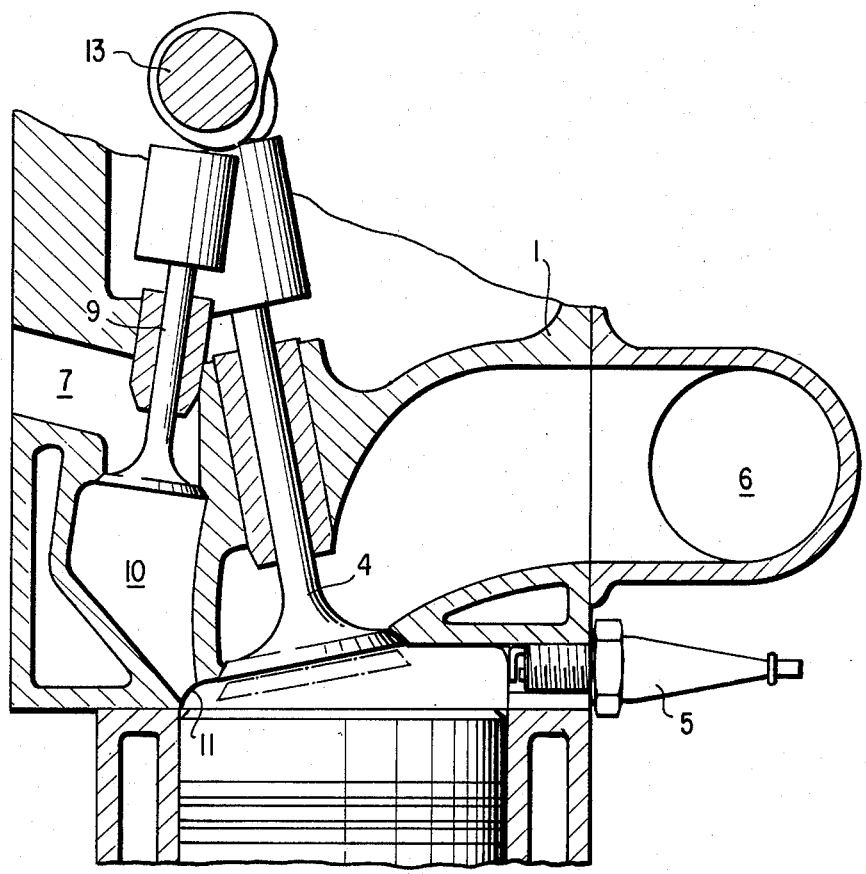
FIG. 6 is a schematic axial section of a combustion chamber having a precombustion chamber for introduction of air.
Figure 7:
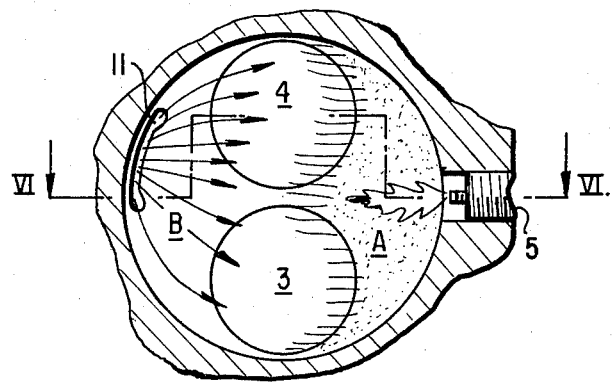
FIG. 7 is a schematic top view of the combustion chamber of FIG. 6.

FIGS. 6 and 7 show a variant of the preceding case in which the air injection valve 9 opens into an auxiliary air chamber 10. The use of such an auxiliary air chamber assures a reserve of additional pure air which, by not having been mixed with fuel during the explosion, will retain its combustion properties. During the power and exhaust strokes, this air already heated by its passage into the cylinder head 1 and its stay in the auxiliary air chamber 10, will be sucked into the combustion chamber when it will thus complete combustion. Orientation of the orifice 11 of the auxiliary air chamber towards the exhaust valve opening will assist evacuation of this air towards the exhaust passage where it will finish combustion of the gases in normal post-combustion.

A volume for auxiliary air chamber 10 equal to from 25 to 50% of that of the combustion chamber will be a good compromise with the maintenance of a satisfactory compression ratio.

Better dynamic and thermal efficiency is thus obtained in comparison with known post-combustion systems where the unpreheated air is injected upstream into the exhaust manifold.

In the embodiment illustrated in FIG. 6, which is a stepped section VII—VII of FIG. 7, the input manifold 7 for injected air, in the form of a channel, and the auxiliary air chamber 10 are advantageously cast in the cylinder head. Operation of valves 3, 4 and 9 can be simply achieved with a common overhead camshaft 13. The communicating orifice 11 between the auxiliary air chamber and the cylinder will be advantageously realized in the form of a slot oriented towards the opening of the exhaust valve 4, close thereto and essentially in the same plane thereof.

In casting, the two ends of the slot can easily be enlarged to increase the flow of air along the walls of the chamber during injection at the end of the intake stroke, which assists the sweeping of condensed fuel from the walls and the formation of a rich region nicely surrounding the plug 5, as indicated in FIG. 7. This orifice shape favors the formation of the stratum of air B (FIG. 7) crowding the fuel mixture A towards the plug 5, at the end of intake, as well as the entraining of the air remaining in the auxiliary air chamber 10 at the end of the explosion and power stroke towards the opening of valve 4 during the exhaust phase.

Figure 8:
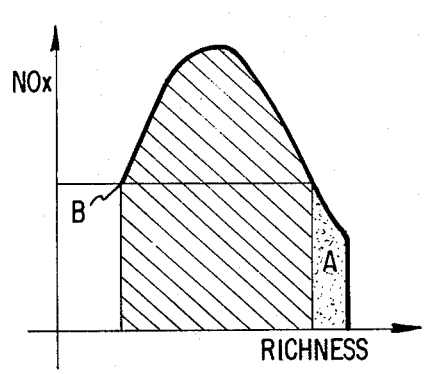
FIG. 8 shows a diagram of the degree of formation of nitrogen oxides as a function of richness of the mixture, showing the degrees corresponding to the two types of predominant richness realized by the present invention.

FIG. 8 is a diagram showing the degree of formation of nitrogen oxides as a function of mixture richness for a given combustion temperature, showing the regions of the lowest degree corresponding to the two types of charge present in accordance with the invention: a rich zone A near the plug and a very lean zone B, part being practically pure air, in the rest of the combustion chamber. FIG. 8 further illustrates the hatched zone of intermediate richness being reduced to the extreme by the later formation of the pocket of air B preceding ignition which reduces the surface and the thickness of this interface between zones A and B, together with the cooling effect of the excess air in B.

In a preferred combination of the preceding embodiments will be utilized a precombustion chamber with the system of introduction of air by the exhaust valve seen above. Thus, there is avoided the complication of an additional valve for this purpose, retaining a standard timing system, with easier control of the stratification by the precombustion chamber.

Figure 9:
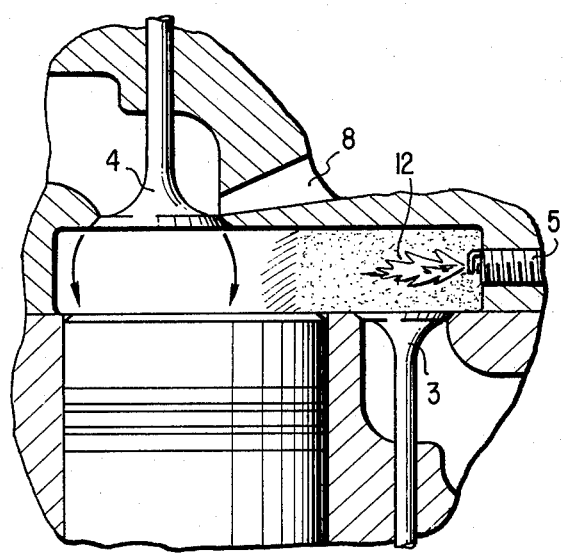
FIG. 9 shows schematically a variant of the embodiment of FIG. 1 with introduction of air by the exhaust valve, and with the inlet valve in a lateral extension of the combustion chamber forming a precombustion chamber.

FIG. 9 gives an example of such an arrangement in which the exhaust valve 4 is furnished, as in the case of FIG. 1, with an air introducing channel 8. The combustion chamber is extended laterally by a projection 12 forming a precombustion chamber and receiving the inlet valve 3 and the plug 5. The same camshaft will operate valve 3, mounted at the side, directly and valve 4 by standard rocker arms.

Figure 10:
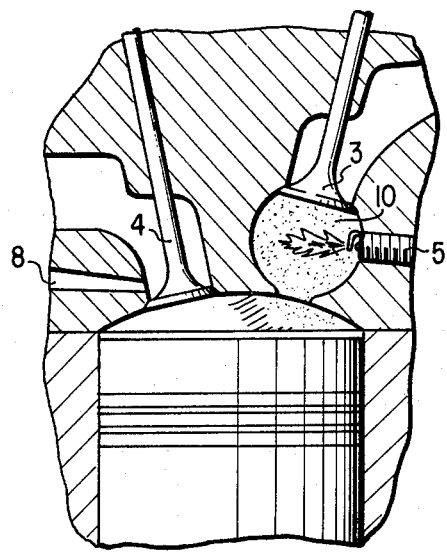
FIGS. 10 and 11 show other variants of the embodiment of FIG. 1, the inlet valve or the exhaust valve opening into a precombustion chamber, which contains the thinning air in the latter case (FIG. 11) or the rich mixture and the spark plug in the case of FIG. 10.

FIG. 10 shows a further variant with standard precombustion chamber 10 opening through a restriction into the main chamber. In these two cases, the precombustion chamber holds a rich mixture which undergoes ignition.

Figure 11:
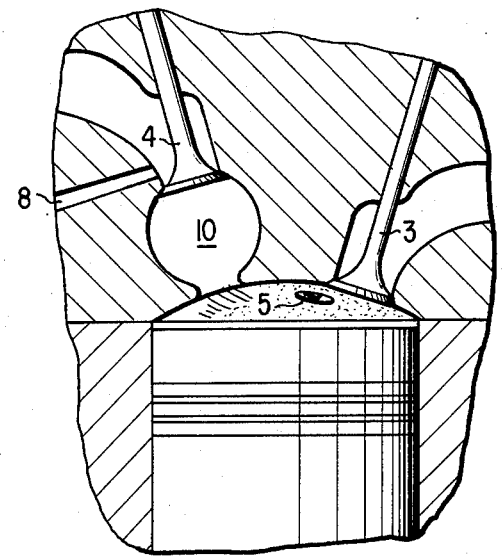

In the case of FIG. 11 the auxiliary air chamber 10 has the exhaust valve 4, still with air inlet 8 and acts to retain a lean mixture as in the embodiment of FIG. 6, the ignition of the rich mixture occurring in the combustion chamber. The passage of exhaust gases into the auxiliary air chamber has a favorable effect on the heating of the thinning air which is held there later.

Thus, according to the present invention, the charging method leads in a normally-carbureted internal combustion engine to a stratification of the charge which allows excellent ignition in the rich part and complete combustion on account of the surplus air.

Turbulence in the inlet where only the carbureted mixture is admitted then has less perturbing effect on the stratification. The latter is consequently more precisely controlled. There results, at the instant of ignition, two very contrasted mixtures, a rich one in the ignition region, the other very lean in the opposite region, both corresponding to mixtures with low percentage of formation of nitrogen oxides. In addition, the excess air guarantees complete combustion of the fuel, burning of the carbon monoxide and hydrocarbon continuing during the exhaust phase.

The association of the introduction of thinning air by the exhaust valve, as seen previously, with a precombustion chamber into which the inlet or the exhaust valve opens permits still more precise control of the stratification, the precombustion chamber limiting the intermixing of the air and the rich mixture, and the effects of turbulence.

This solution has also the advantage of avoiding the third valve for introduction of air and thus bringing the cost of the motor into line with that of motors with standard charging.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An internal combustion engine with stratified charge and controlled ignition comprising:
  at least one combustion chamber for receiving a rich fuel mixture, and means for admitting a rich fuel mixture to said combustion chamber, means for introducing a quantity of air into the upper region of the combustion chamber opposite the ignition region which is also disposed within the upper region of the combustion chamber said means for introducing said quantity introducing said quantity of air at the end of the intake stroke whereby the air is introduced just prior to ignition, said air introducing means comprising a passage opening into the exhaust duct close to the opening orifice of the exhaust valve.

2. An internal combustion engine as set forth in claim 1, wherein the air is under pressure.

3. An internal combustion engine as set forth in claim 1, wherein the air introducing means comprises means for introducing said air during the opening-overlap period of the inlet and exhaust valves and for completing said air introduction at the end of the intake phase by means of a supplementary lift of said exhaust valve.

4. An internal combustion engine as set forth in claim 1, wherein the air introducing means comprises means for introducing said air during the opening-overlap period of the inlet and exhaust valves and at the end of the intake phase by means of a prolonged opening of said exhaust valve.

5. An internal combustion engine as set forth in claim 1, wherein the passage for introducing air opens into the exhaust duct through an aperture of slotted shape essentially parallel to the peripheral gap of the opening of said exhaust valve, close to said opening and opposite the ignition region of a spark plug with respect to the axis of said valve.

6. An internal combustion engine as set forth in claim 4, wherein the passage for introducing air is cast in, and opens onto a lateral surface of the cylinder head.

7. An internal combustion engine as set forth in claim 1, wherein the introduced air is conducted by a channel formed by casting in the surface of the exhaust manifold clamped against the cylinder head and opening into corresponding injection passages in the latter.

8. An internal combustion engine as set forth in claim 1, wherein said air is introduced by a valve opening into the combustion chamber on the side opposite the ignition region during the intake phase.

9. An internal combustion engine as set forth in claim 8, wherein said air introducing means comprises means for opening said injection valve at the end of the intake phase.

10. An internal combustion engine as set forth in claim 1, wherein said air is introduced by means of a passage opening into said exhaust duct close to the opening orifice of said valve and on the opposite side from a precombustion chamber receiving the inlet valve and spark plug and containing the rich fuel mixture.

11. An internal combustion engine as set forth in claim 10, wherein said precombustion chamber is incorporated into said main combustion chamber and receives a lateral inlet valve.

12. An internal combustion engine as set forth in claim 1, wherein said air is introduced by means of a passage opening into the exhaust duct close to the opening orifice of the valve, said valve opening into a precombustion chamber itself opening into said main combustion chamber on the side opposite the region of ignition of the plug.

* * * * *